United States Patent
Duboc et al.

(10) Patent No.: US 7,380,947 B2
(45) Date of Patent: Jun. 3, 2008

(54) MULTI-STEP TURN OFF MODE FOR PROJECTION DISPLAY

(75) Inventors: Robert M. Duboc, Menlo Park, CA (US); Andrew G. Huibers, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 200 days.

(21) Appl. No.: 10/894,703

(22) Filed: Jul. 19, 2004

(65) Prior Publication Data

US 2005/0013008 A1    Jan. 20, 2005

Related U.S. Application Data

(60) Provisional application No. 60/488,479, filed on Jul. 18, 2003.

(51) Int. Cl.
*G03B 21/00* (2006.01)
*G03B 21/26* (2006.01)
*G03B 21/20* (2006.01)
*G03B 21/28* (2006.01)
*G02F 1/1335* (2006.01)

(52) U.S. Cl. ............... 353/121; 353/30; 353/85; 353/99; 349/5; 349/7

(58) Field of Classification Search ............ 353/30, 353/85, 99, 121; 349/5–9; 362/559
See application file for complete search history.

(56) References Cited

U.S. PATENT DOCUMENTS

| 4,340,843 | A  |   | 7/1982 | Anderson |
|---|---|---|---|---|
| 6,046,840 | A  |   | 4/2000 | Huibers |
| 6,388,661 | B1 |   | 5/2002 | Richards |
| 6,523,961 | B2 |   | 2/2003 | Ilkov et al. |
| 6,992,811 | B2 | * | 1/2006 | Williams et al. ............ 359/291 |
| 7,083,287 | B2 | * | 8/2006 | Pate ........................... 353/85 |
| 7,099,065 | B2 |   | 8/2006 | Patel et al. |
| 7,165,845 | B2 | * | 1/2007 | Takeda et al. ................. 353/31 |
| 2002/0008856 | A1 | * | 1/2002 | Okamori et al. ............. 353/69 |
| 2004/0076018 | A1 | * | 4/2004 | Okamoto .................... 362/559 |

OTHER PUBLICATIONS

Weichmann, U., et al., "UHP-lamps for projection systems: Getting always brighter, smaller and even more colorful," Liquid Crystal Materials, Devices, and Applications X and Projection Displays X, Proceedings of SPIE-IS&T Electronic Imaging, SPIE vol. 5289, 2004 SPIE and IS&T, pp. 255-265.

* cited by examiner

*Primary Examiner*—Melissa Jan Koval
(74) *Attorney, Agent, or Firm*—Wade James Brady, III; Frederick J. Telecky, Jr.

(57) ABSTRACT

Disclosed herein is a method of operating display systems with reduction of the warm-up time of an arc lamp in the event of an accidental or unintentional turn-off.

26 Claims, 6 Drawing Sheets

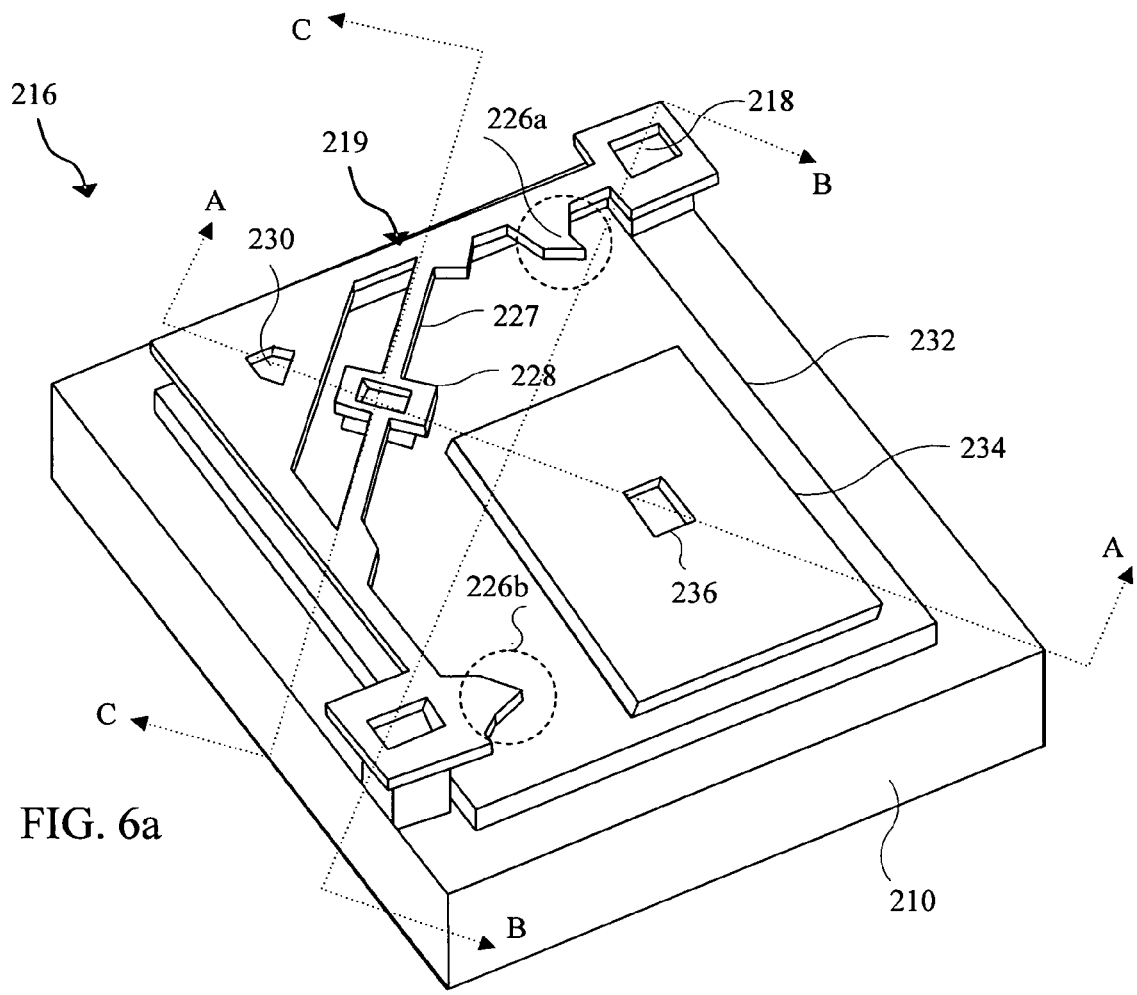
FIG. 6a
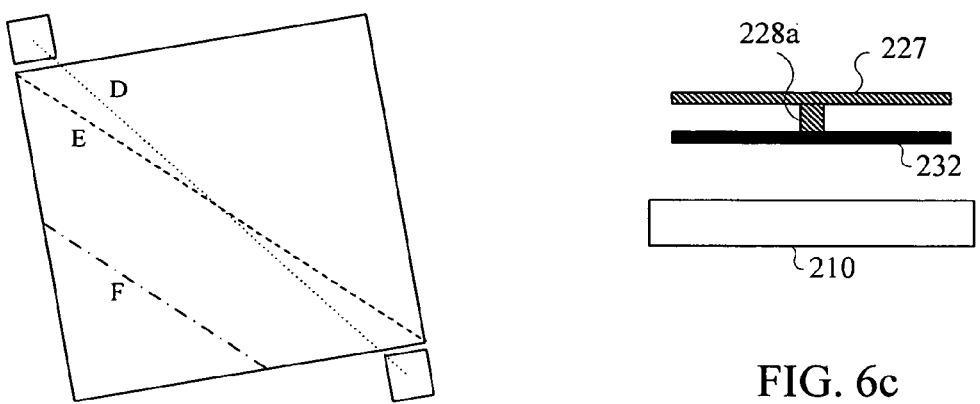
FIG. 6b
FIG. 6c

MULTI-STEP TURN OFF MODE FOR PROJECTION DISPLAY

CROSS-REFERENCES TO RELATED APPLICATIONS

The present application claims priority under 35 USC §119(e) section 1 from provisional U.S. Patent Application Ser. No. 60/488,479, for "Multi-Step Turn Off Mode for Projection Display," filed Jul. 18, 2003, the disclosure of which is incorporated by reference.

TECHNICAL FIELD OF THE INVENTION

The present invention relates to rear and front projection display systems. More particularly, the invention relates to a method of reducing the warm-up time of an arc lamp in the event of an accidental or unintentional turn-off.

BACKGROUND OF THE INVENTION

Projection displays are increasingly being used for television applications. Generally, projection displays comprise a light source, filters for separating the light from the light source into colors, one or more spatial light modulators (this can be, for example, one or more liquid crystal arrays or micromirror arrays), and projection optics for projecting an image from the array(s) onto a target. Light sources for such projection displays are often arc lamps which require a period of time (often on the order of minutes) to warm up. As set forth in "UHP Lamps for Projection Systems" by Pekarski et al. (Philips Research Laboratories), incorporated herein by reference, the physics of lamps such as UHP (ultra high performance) lamps is such that a time period is required for the lamp to turn on, once such a lamp is turned off. Such warm up time can be an annoyance to a viewer of a projection television—particularly if the television is accidentally turned off.

The spatial light modulator can be one such as set forth in U.S. Pat. No. 6,046,840 to Huibers or U.S. Pat. No. 6,523,961 to Ilkov et al., which spatial light modulator can be addressed such as set forth in U.S. Pat. No. 6,388,661 to Richards, each of these being incorporated herein by reference in their entirety.

SUMMARY OF THE INVENTION

In an embodiment of the invention, a method for operating a projection display is disclosed that comprises: operating the projection display including projecting light from a light source onto a spatial light modulator and projecting light from the spatial light modulator onto a target; turning the projection display off which results in a) continued operation of the light source and b) turning pixels of the display to a desired position or preventing the light from reaching the target; and after a predetermined period of time, turning the light source off.

BRIEF DESCRIPTION OF DRAWINGS

For a more complete understanding of the present invention and for further advantages thereof, reference is now made to the following detailed description taken in conjunction with the accompanying drawings. The accompanying drawings are illustrative and are not to scale. In addition, some elements are omitted from the drawings to more clearly illustrate the embodiments.

FIGS. 6a through 6c illustrate a micromirror in accordance with an embodiment of the present invention, wherein FIG. 6a is a perspective view of the micromirror; wherein FIG. 6b is a cross-sectional view of the micromirror in FIG. 6a; and wherein FIG. 6c is another cross-sectional view of the micromirror in FIG. 6a.

DETAILED DESCRIPTION OF THE EMBODIMENTS

The present invention provides a method and an apparatus for avoiding a waiting period during lamp warm up if the projection display has been turned off for less than a predetermined time period. In particular, in the present invention, when a projection display is turned off, such as by a user turning or pressing an Off button on the projection display device, or by remote control, the display target goes black by placing all pixels of the spatial light modulator to their OFF position—thus giving the appearance that the projection display has been powered off, though the lamp in the display remains on. After a predetermined time period after the OFF button has been pressed, which period can be set by the user if desired, the lamp will finally turn OFF.

Figure 1:
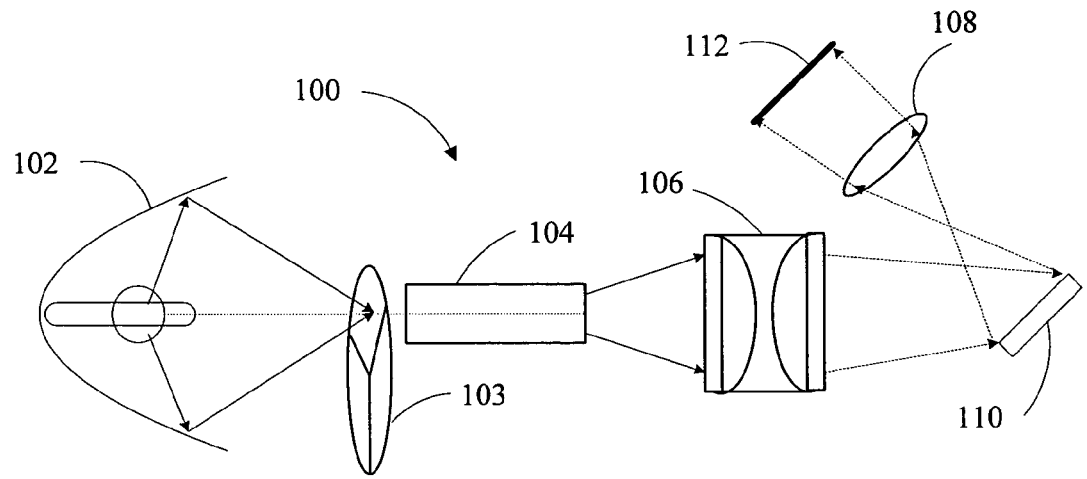
FIG. 1 is a diagram that schematically illustrates an exemplary display system employing a spatial light modulator having an array of micromirrors.

Turning to the drawings, FIG. 1 is a diagram schematically illustrating an exemplary display system in which the various embodiments of the invention can be implemented. Referring to FIG. 1, in one basic configuration, the display system comprises light source 102, optical devices (e.g. light pipe 104, collection optics 106 and projection optics 108), and spatial light modulator 110 that further comprises an array of micromirrors. Also shown is a display target 112 onto which an image is directed. Light source 102 (e.g. an arc lamp) directs light through the light integrator/pipe 104 and collection optics 106 and onto spatial light modulator 110. The micromirrors of the spatial light modulator 110 are selectively actuated by a controller (e.g. as disclosed in U.S. Pat. No. 6,388,661 issued May 14, 2002 incorporated herein by reference) so as to reflect—when in their "ON" position—the incident light into projection optics 108, resulting in an image on display target 112 (screen, a viewer's eyes, a photosensitive material, etc.). Generally, more complex optical systems are often used, especially in displaying applications for color images, such as the display system in FIG. 2.

Figure 2:
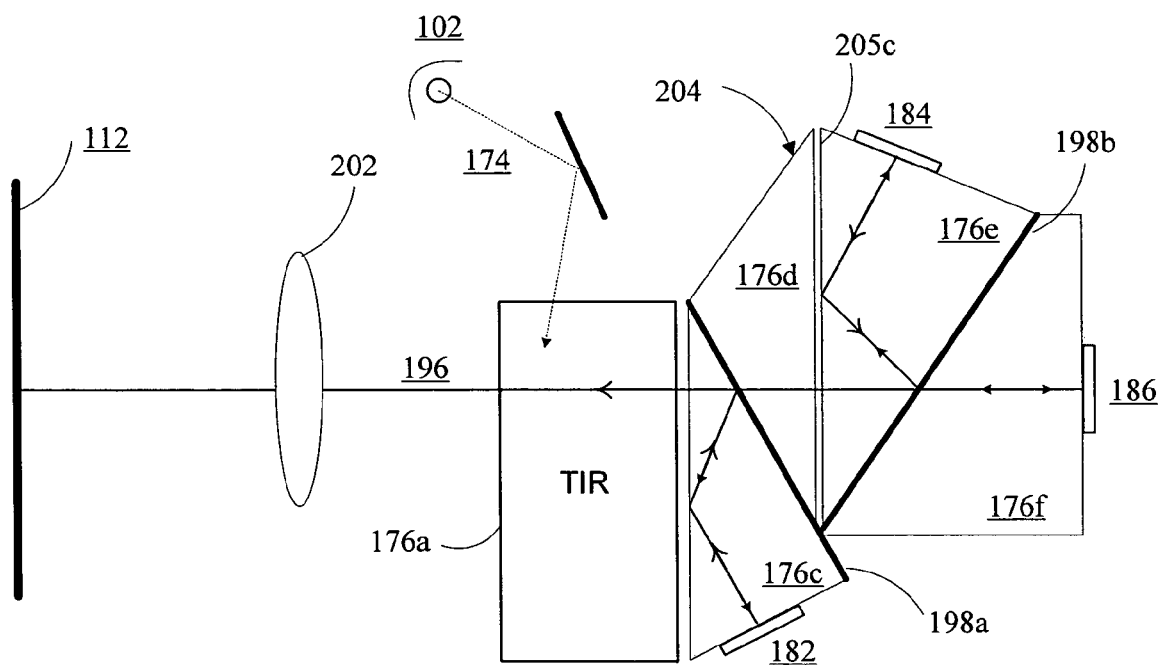
FIG. 2 is a diagram that schematically illustrates another exemplary display system employing three spatial light modulators, each having an array of micromirrors.

Referring to FIG. 2, another exemplary display system employing three spatial light modulators, each comprising an array of micromirrors and being designated for respectively modulating the multi-color (e.g. three color such as red, green and blue) light beams, is presented therein. The display system employs a dichroic prism assembly 204 for splitting incident light into three primary color light beams. Dichroic prism assembly comprises prisms 176a, 176b, 176c, 176d, 176e and 176f. Totally-internally-reflection (TIR) surfaces, i.e. TIR surfaces 205a, 205b and 205c, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into prism 176b and is directed towards TIR surface 205a at an angle larger than the critical TIR angle of TIR surface 205a. TIR surface 205a totally internally reflects the incident white light towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green and blue lights can be properly modulated. The modulated red, green and blue lights are recollected and delivered onto display target 112 through optic elements, such as projection lens 202, if necessary.

Figure 3:
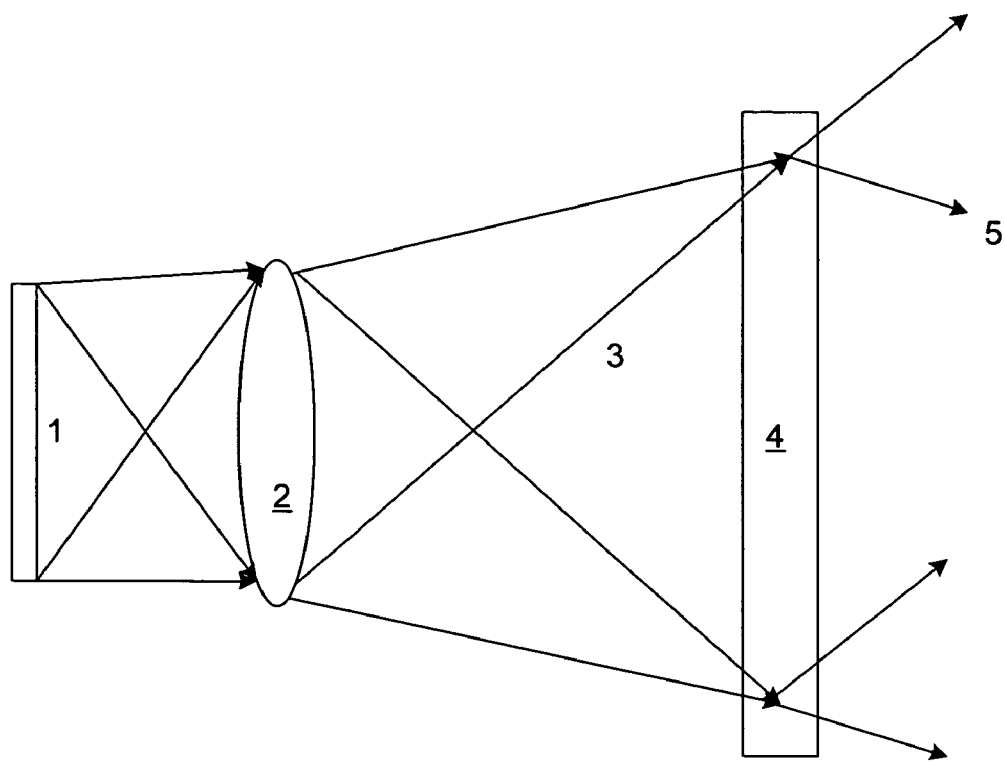
FIG. 3 is a simplified and sectional view of a rear projection display.

Similar to FIGS. 1 and 2, FIG. 3 illustrates a general diagram for a rear projection system. It consists minimally of an imager 1 that converts electronic signals from an external source into an optical image appearing on imager 1, and projection optics 2 for projecting that image onto a screen 4. The viewer 5 sits on the opposite side of the screen 4 and sees the image that appears on the screen 4. The function of the rear projection screen 4 is to systematically scatter the projected image from the imager 1 in the forward direction. The arc lamp typically provides the light source for the image. FIGS 1 through 3 are all examples of rear projection displays. Referring to FIG. 1, in a front projection system the screen 112 would be separate from the other components.

Figure 4A:
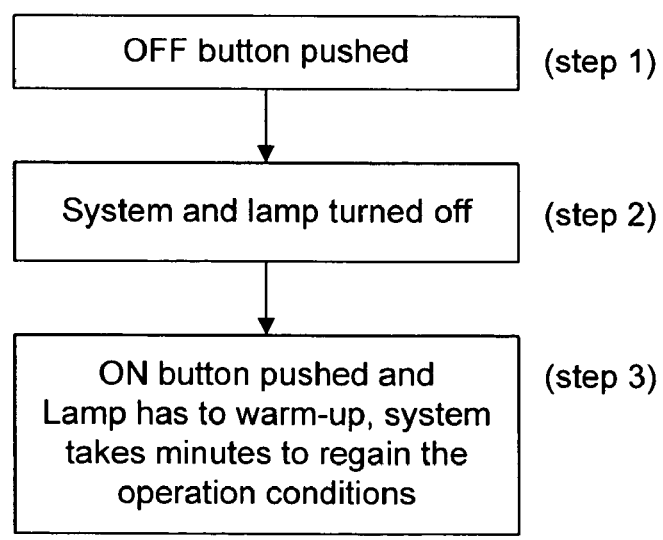
FIG. 4a illustrates therein a method in the art for turning ON and OFF a display system.

Referring to FIG. 4a, a typical method in the art for use in turning ON and OFF a display system is illustrated therein. When the "OFF" button is pushed (step 1), the display system is turned off (step 2). In the OFF state, when the ON button is pushed (step 3), the lamp has to warm up; and the system takes minutes to regain the operation conditions. The present invention applies to both types of projection systems. In both rear and front projection displays, the light can be prevented from reaching screen in accordance with the present invention, making it appear to the user that the system is off. The invention is also applicable to boardroom projectors and other projection systems that would benefit from the delayed powering off of the lamp.

Figure 4B:
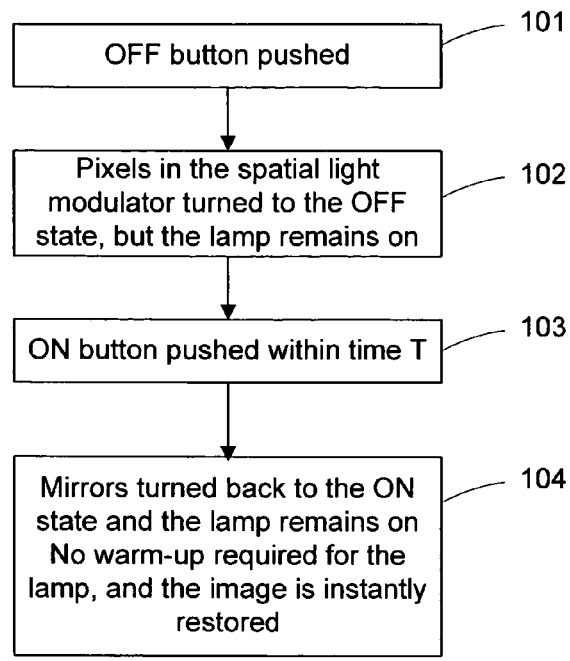
FIGS. 4b to 4d are flow charts demonstrating methods for turning ON and OFF a display system according to embodiments of the invention.
Figure 4C:
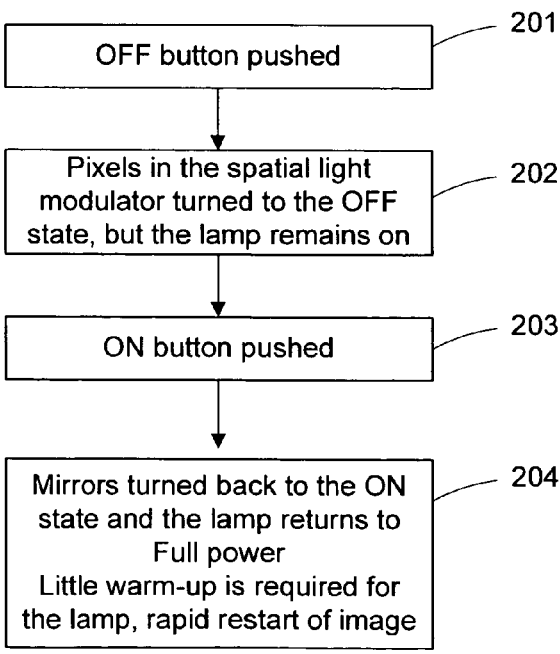
Figure 4D:
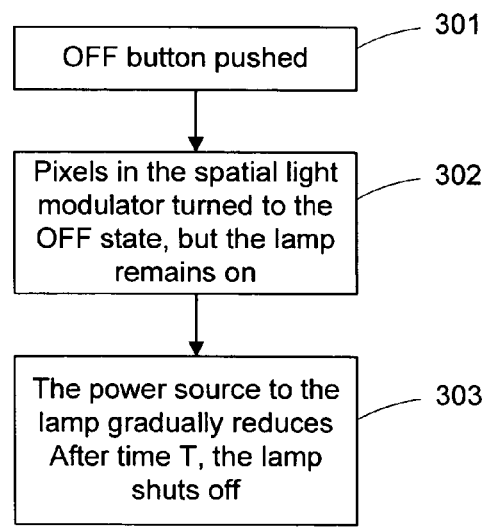

The time period after which the projection display is turned OFF but before the lamp is fully turned OFF, can be any desired time period, represented in FIGS. 4b through 4d as time period T. Such a time period is preferably at least 5 seconds (though typically at least 15 seconds), and more likely at least one minute. If desired, the time period could be even longer (at least 5 minutes—or even 10 minutes or more) and a corresponding decrease in lamp power during this time could diminish the lifetime issues associated with the increased ON time of the lamp. Referring to FIG. 4c, if desired, power to the lamp could be gradually decreased until the end of the time period—such that correspondingly longer time periods after the projection system is turned OFF correspond to correspondingly longer time periods for the lamp to warm up—but still less time than if the lamp had been turned off altogether (as in FIG. 4c). It is also possible to turn off or decrease the power being applied to other parts of the projection system during the time after the user has turned the system off but before the lamp has been fully turned off. As an example, the color wheel or rotating prism could stop rotation during this time (if the system has a rotating color wheel or prism), or such wheel or prism could be rotated at a lower speed. Any such delayed or reduced powering off (whether the lamp or another part of the projection system) can be "trained" such that the time and/or power is user-based—i.e. user habits over time would be used to train the system to optimize the delayed final turn off. All the delayed turn-off functions disclosed herein can be accomplished through executions of a plurality of computer readable instructions generated from a plurality of functional modules, which can be stored in storage of the projection system, or a periphery device of projection system. The storage can be a volatile or a non-volatile memory.

Referring to FIG. 4b, at 101, a user turns off the projection display. 102—the pixels in the spatial light modulator are turned to their OFF state while the lamp remains ON—such that the projection display appears to the user that it is OFF. After a predetermined period of time T, at 103 a user turns the projection display back ON—which display becomes viewable quickly to the user without a needed lamp warm-up time.

Referring to FIG. 4c, at 201, a user turns off the projection display. 202—the pixels in the spatial light modulator are turned to their OFF state while the lamp remains ON—such that the projection display appears to the user that it is OFF. In this embodiment of the invention, the lamp gradually begins to reduce its power after a predetermined time period T, 203. Within another predetermined time period, at 204, a user turns the projection display back ON—which display becomes viewable quickly since the lamp is still powered, although at a reduced level. This procedure still significantly reduces warm-up time of the lamp.

Referring to FIG. 4d, at 301, a user turns off the projection display. 302—the pixels in the spatial light modulator are turned to their OFF state while the lamp remains ON—such that the projection display appears to the user that it is OFF. Though preferably all pixels are turned to OFF, it is also possible to have the projector be in a "screen saver" mode at this point—being actuated to form a moving image, or forming a still image (projection system company logo, user downloaded image, etc.). At 303—an optional embodiment—the lamp would begin to gradually decrease to a reduced power. After a predetermined period of time, at 304 the lamp is turned OFF.

Figure 5A:
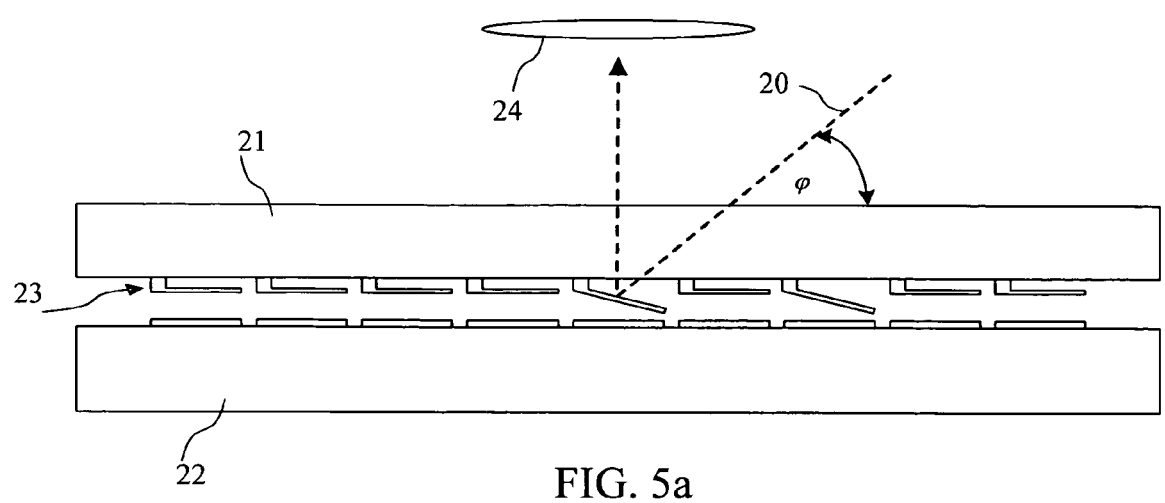
FIGS. 5a through 5c are perspective views of a micromechanical mirror, demonstrating the three stages of operation of the micromirror array.
Figure 5B:
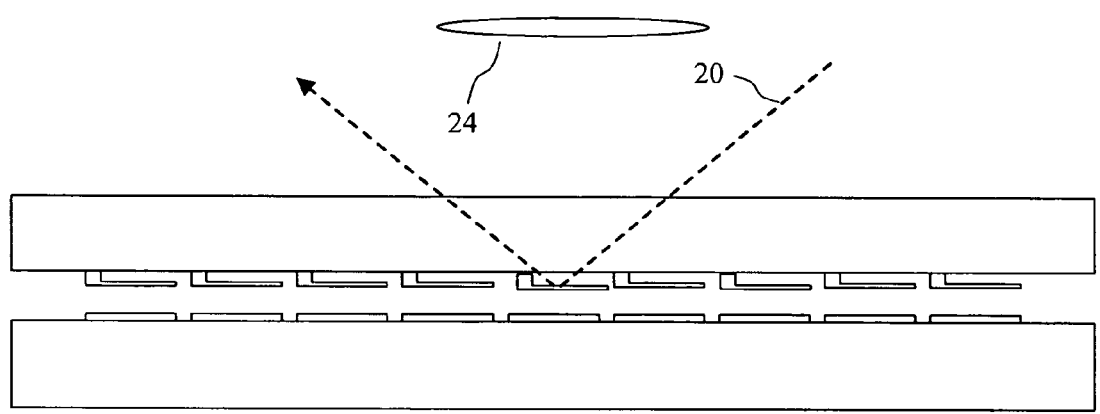
Figure 5C:
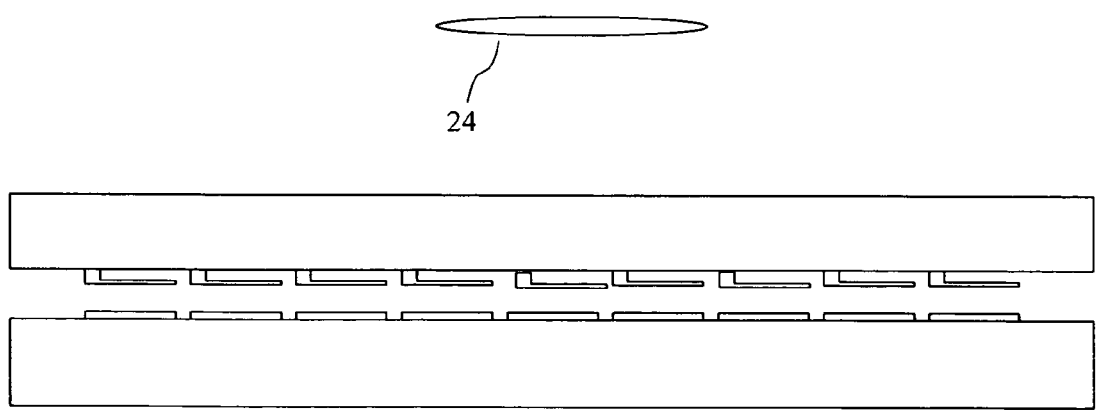

The spatial light modulator of the present invention can be, in one embodiment, a micromirror array device. FIGS. 5a through 5c demonstrate the three stages of the device relevant the present invention. Referring to FIG. 5a, the micromirror array device comprises an array of micromirrors formed on a substrate, which can be a glass or quartz substrate transmissive to visible light in this example. A typical size of the micro-mirror is a few micrometers or less. The glass or quartz substrate may have optical films, such as an anti-reflection film coated thereon. The micromirrors spatially modulate the incident light by selectively reflecting the incident light onto or away from a projection lens (e.g. projection lens 108 in FIG. 1) for producing images or videos on a display target (e.g. display target 112 in FIG. 1). The selective reflection of the incident light by the micromirrors is accomplished through an array of electrodes and circuitry. Specifically, each micromirror comprises a mirror plate, which is associated with an electrode. An electrostatic field can thus be established between the mirror plate and the associated electrode. In response to the established electrostatic field, the mirror plate rotates to either an ON state (FIG. 5a) or an OFF state (FIG. 5b). In the ON state, the mirror plate reflects the incident light into the projection optics, and in the OFF state, the mirror plate reflects the incident light away from the projections optics. FIG. 5a illustrates the micromirror device in the ON state, which occurs whenever an image is projected. FIG. 5b illustrates the micromirror device during step 102 in FIG. 4b. The light will still be incident on the mirrors, but the light will be directed away from the projection optics. FIG. 5c illustrates the device during step 304 of FIG. 4d. The mirrors remain in their OFF state and the light is no longer incident thereon, since the lamp has shut off after a predetermined amount of time.

FIGS. 6a through 6c are more specific diagrams of one example of micromirrors for use in the present invention. Each micromirror has an axis of rotation, wherein a line drawn between the two posts, 218 (formed on a light transmissive substrate) is not parallel with the axis of rotation. This is illustrated in FIG. 6a. Referring to FIG. 6a, a perspective view of a portion of an exemplary micromirror of the micromirror array is illustrated therein. As seen, hinge support 219 is formed on substrate 210, which can be a light transmissive substrate such as a glass substrate transmissive to visible light. The hinge support connected to the substrate can include two posts 218. Hinge 227 is affixed to the hinge support. Mirror plate 232 is attached to hinge 227 via hinge connector 228. In this particular example, the hinge contact 228 is disposed at a location not at the center of the mirror plate. This configuration facilitates the mirror plate rotating along a rotational axis that is parallel to but offset from the diagonal of the mirror plate when viewed from the top of substrate 210. By "parallel to but offset from the diagonal", it is meant that the axis of rotation can be exactly parallel to or substantially parallel to (±10° degrees) the diagonal of the micromirror but is offset in both a vertical and a lateral direction. Such a rotation axis can be achieved by attaching the hinge structure to the mirror plate at a point not along the mirror plate diagonal 211. The point of attachment can be at least 0.5 um, at least 1 um, or at least 2 um away from the diagonal 211. In one embodiment, the point of attachment is from $1/40$ to $1/3$ the length of the diagonal away from diagonal 211, or from $1/20$ to $1/4$ if desired—although any desired distance away from the diagonal is possible if so desired in the present invention. The micromirror preferably has a substantially four-sided shape. Whether the micromirror is a rectangle, square, rhombus or trapezoid, even if the corners are rounded or "clipped" or if an aperture or protrusion is located on one or more of the sides of the micromirror, it is still possible to conceptually connect the four major sides of the micromirror shape and take a diagonal across the middle of the micromirror. In this way, a center diagonal can be defined even if the micromirror plate is substantially but not perfectly a rhombus, trapezoid, rectangle, square, etc. However, the rotation axis of the micromirror plate is not along the center diagonal but is along direction 213. This type of design benefits the performance of the micromirror device in a number of ways. One advantage of this asymmetric offset arrangement is that the micromirror plate can rotate at a larger angle than the rotation angle that can be achieved in a symmetrical arrangement (with a mirror—plate substrate gap being the same). The length of the diagonal of the mirror plate is preferably 25 microns or less.

In addition to the mirror plate, the hinge and the hinge contact, additional features are provided for the micromirror according to the present invention. For example, extension-plate 234 is constructed on mirror plate 232 for enhancing electrostatic coupling of the mirror plate with the adjacent electrode that is provided for driving the mirror plate to rotate relative to the substrate. As can be seen in the figure, the extension-plate is connected to the mirror plate via an extension-plate post 236 and on the opposite side of the mirror plate to substrate 210 to which the hinge support and the hinge are connected. The extension-plate post 236 is disposed at a location not at the center of the mirror plate. Moreover, the location of the extension-plate post 236 at the mirror plate is not along a line connecting the two posts 218. The extension-plate is connected to the substrate via the hinge connect, the hinge, the hinge support and the two posts. The relative position of the mirror plate, the hinge and the extension-plate is better illustrated in FIGS. 6b and 6c.

Referring to FIG. 6b, a cross-sectional view of the micromirror along line AA in FIG. 6a is illustrated therein. Mirror plate 232 is above substrate 210. Hinge contact 228 connects hinge 227 (in FIG. 6a) to the mirror plate. Extension-plate 234 is constructed on the mirror plate. Referring to FIG. 6c, another cross-sectional view of the micromirror along line BB in FIG. 6a is illustrated therein. As seen, two posts 218 are formed on the substrate. Mirror plate is held on the substrate and extension-plate 234 is constructed on the mirror plate. Referring back to FIG. 6a, the extension-plate as illustrated is within the micromirror. However, this is not an absolute requirement. Rather, the extension-plate can be extended beyond the micromirror. In particular, the extension-plate of a micromirror can be extended beyond the micromirror having the mirror plate to which said extension-plate is connected into adjacent micromirrors in a micromirror array. This design further enhances coupling of the micromirror to the electrostatic fields, because the coupling is increased with the area of the extension-plate increased.

In one embodiment, the extension plate is metallic, and is electrically connected to the mirror plate. In operation, the mirror extension plate is held at the same voltage as the mirror plate. However, because the extension plate is closer to the electrode than the mirror plate, electrostatic force exerted to the extension plate is larger than the force to the mirror plate. That is, compared to the required voltage difference between the electrode and the mirror plate to rotate the mirror plate to a desired angle, a smaller voltage difference between the extension plate and the electrode will be enough to rotate the mirror plate to the same desired angle. In the embodiment, the extension plate has the same distance from the mirror plate as the distance between hinge 227 and the mirror plate. This type of arrangement simplifies the fabrication of the micromirror device. In another embodiment, the extension plate has a different distance from the mirror plate than the hinge. For example, the distance between the extension plate and the mirror plate is larger than the distance between the hinge and the mirror plate. In this situation, the required voltage difference can be even smaller to achieve the desired rotation angle than the necessary voltage difference by the micromirror to achieve the same desired angle, wherein the hinge and the extension plate have the same distance from the mirror plate.

Alternatively, the extension-plate can be a dielectric plate having a dielectric constant larger than 1. In operation, when voltages are applied to the electrode and the mirror plate, resulting a voltage difference between the electrode and the mirror plate, the electric force exerted to the mirror plate is larger than the electric force exerted to the mirror plate resulted from the same voltage difference established between the mirror plate and the electrode without dielectric plate in between. That is, compared to the required voltage difference between the electrode and the mirror plate to rotate the mirror plate to a desired angle, a smaller voltage difference is necessary to rotate the mirror plate to the same desired angle. Similar to the embodiment wherein the extension plate is metallic, the dielectric extension plate can be spaced from the mirror plate with either the same or a different distance as that between the mirror plate and the hinge.

In addition to the extension-plate, the micromirror may include other additional features. For example, stops 226a and 226b can be part of the hinge support for stopping the rotation of the mirror plate to the ON state, and it can thus be used to define a uniform ON state angle for the micromirrors of the micromirror array device. Stop 230 may also be a part of the hinge support. This stop is better illustrated in the cross-sectional view of FIG. 6b. Referring back to FIG. 6b, stop 230 is formed on the hinge support and is extended towards the mirror plate such that the clockwise rotation of the mirror plate can be stopped by stop 230 when mirror plate achieves a certain rotation angle. The value of the angle (OFF state angle) is determined by the location (e.g. the distance from hinge contact 228) of stop 230 and the height of stop 230. This stop can be used to define a uniform OFF state for the mirror plate of the micromirror and the micromirror array. In order to drive the mirror plate to rotate relative substrate to the OFF state, another electrode (not shown) is provided.

When the desired OFF state angle of the micromirror is non-zero, a second electrode other than the first electrode that drives the mirror plate to rotate to the ON state angle can be provided for driving the mirror plate to rotate to the OFF state angle. Or, simply a voltage bias can be applied between the mirror plate and substrate 210 (e.g. a conductive coating thereon). In order for the mirror plate to rotate to a second OFF state rotation direction that is opposite to the first rotation direction, a first electric field is established between the mirror plate/extension plate and the electrode on the opposing substrate for driving the mirror plate to rotate to the ON state angle. And when this field for the ON state is removed, the bias on the substrate 210 will naturally pull back the mirror plate to a non-flat OFF state.

More particularly, the bias on substrate 210 is preferably an electrically conductive film deposited on the surface of the substrate 210 and the electrically conductive film is preferably transmissive to visible light. In operation, an electric potential is applied to the film, and the electric potential can be maintained during the entire operation of the micromirror. In this situation, the electric potential pulls the mirror plate to the OFF state when the ON state electric field between the extension-plate and the first electrode is not present. Otherwise, the electrostatic force between the ON state electrode and the extension-plate overcomes any bias from the substrate 210, such that the mirror plate rotates to the ON state from the OFF state. Instead of providing stop 230 for stopping the rotation of the mirror plate when the OFF angle is achieved, other stopping mechanisms may also be provided for achieving the same purpose, such as those disclosed in U.S. patent application Ser. No. 10,437,776 to Patel, filed May 13, 2003. Many other micromirrors can be used in the present invention, including those made out of or on a silicon substrate.

Figure 7:
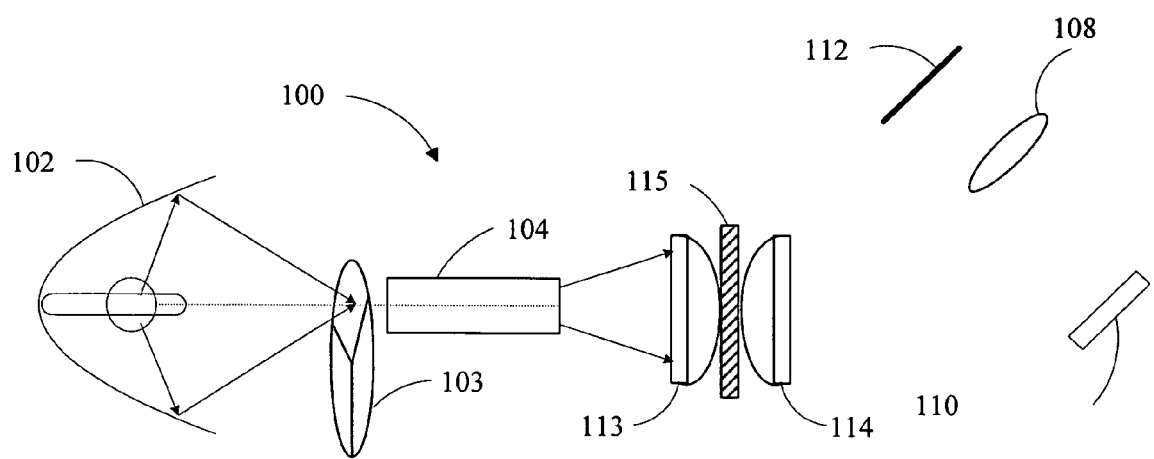
FIG. 7 is a schematic representation of as alternative embodiment of the invention, displaying a standard projection system that includes a shutter device 115 between the condensers as a way to block the light from the screen without turning the pixels of the display to their OFF position.

Referring to FIG. 7, in an alternative solution to reducing the warm-up time of a lamp used in a projection display system, a shutter could be placed between the condenser lenses (optics for imaging light onto the spatial light modulator). When a user turns the projection system off—step 101 in FIG. 4b—the shutter wall drops down between the condensers, blocking the light from the lamp, which remains on (step 102 in FIG. 4b). This allows for the lamp to remain on while the projection display appears OFF to the user. Once again, if the ON button is pushed within a predetermined time period, the shutter would raise and the image would quickly become viewable. The prescribed shutter device is controlled by software inside the projection display system, triggered by the user pushing the OFF button.

To further protect the user from any long loss of the image, an optional "Keep-Alive" circuit could be included to protect the projection system from momentary power outages. This circuit, as one set forth in U.S. Pat. No. 4,340,843 to Anderson, incorporated herein by reference, powers the lamp in the case of a momentary lapse in the power supply—thus allowing for a rapid restart of the projection system since no warm-up of the lamp is required. This circuit used in conjunction with the manipulation of the pixel array would make the projection display appear OFF to the user.

It will be appreciated by those of skill in the art that a new and useful apparatus and method have been described herein. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. In particular, the micromirror array in the examples could be another type of spatial light modulator—such as a liquid crystal (e.g. LCD or LCOS) array. The objects of the invention are achieved in the features of the independent claims attached hereto. Preferred embodiments are characterized in the dependent claims. In the claims, only elements denoted by the words "means for" are intended to be interpreted as means plus function claims under 35 U.S.C. §112, the sixth paragraph.

We claim:

1. A method for operating a projection display, comprising:
   converting electrical energy into light with a light source;
   operating the projection display including projecting the light from the light source onto a spatial light modulator and projecting the light from the spatial light modulator onto a target;
   turning the projection display off which results in a) continued operation of the light source and b) turning pixels of the spatial light modulator to a desired state that does not project the light onto the target;
   if a predetermined period of time expires without receiving an indication that an ON button on the projector or a remote control has been activated, turning the light source off; and
   if the ON button is activated before the predetermined period of time expires, turning the pixels to another state that projects the light onto the target.

2. The method of claim 1, wherein the spatial light modulator is a micromirror array.

3. The method of claim 1, wherein the spatial light modulator is a liquid crystal array.

4. The method of claim 1, wherein the projection system comprises a color wheel that rotates through a beam of the light from the light source so as to form a consecutive sequence of colors that are incident on the spatial light modulator.

5. The method of claim 1, wherein the continued operation of the light source after the projection display is turned off is for a predetermined period of time at least 5 seconds in length.

6. The method of claim 1, wherein the desired state is OFF.

7. The method of claim 2, wherein the light source is an arc lamp.

8. The method of claim 7, wherein the arc lamp has an arc length of around 1.0 mm or less.

9. The method of claim 5, wherein the continued operation of the light source after the projection display is turned off is for at least 1 minute.

10. The method of claim 9, wherein the continued operation of the light source after the projection display is turned off is for at least 5 minutes.

11. The method of claim 10, wherein the continued operation of the light source after the projection display is turned off is for at least 10 minutes.

12. The method of claim 5, wherein during the predetermined period of time, the light source is operated but at a lower power than prior to the turning off of the projection display.

13. The method of claim 12, wherein during the predetermined period of time, the light source is operated at ¾ power or less.

14. The method of claim 13, wherein during the predetermined period of time, the light source is operated at ½ power or less.

15. The method of claim 14, wherein during the predetermined period of time, the light source is operated at ¼ power or less.

16. The method of claim 8, wherein during the predetermined period of time, the light source is operated at consecutively lower power levels up till the end of the predetermined period of time.

17. A method of operating a projection display, comprising:
   converting electrical energy into light with a light source;
   operating the projection display including projecting the light from the light source onto a spatial light modulator and projecting the light from the spatial light modulator onto a target;
   turning the projection display off which results in a) continued operation of the light source and b) prevention of the light from reaching the target;
   after a predetermined period of time, turning the light source off if an ON indication is not received during the predetermined period of time; and
   re-allowing the light to reach the target if the ON indication is received during the predetermined period of time.

18. The method of claim 17, wherein the prevention of the light reaching the target is achieved by a shutter device.

19. The method of claim 17, wherein the prevention of the light reaching the target is achieved by turning pixels of the spatial light modulator to a desired state.

20. The method of claim 17, wherein the turning the projection display off comprises pushing the OFF button on the projection display or a remote control.

21. The method of claim 19, wherein the spatial light modulator is a micromirror array.

22. The method of claim 19, wherein the spatial light modulator is a liquid crystal array.

23. The method of claim 19, wherein the continued operation of the light source after the projection display is turned off is for at least 5 seconds.

24. The method of claim 19, wherein the desired state is OFF.

25. A method of operating a projection display, comprising:
   converting electrical energy into light with a light source;
   operating the projection display including projecting the light from the light source onto a spatial light modulator and projecting light from the spatial light modulator onto a target;
   receiving an indication that an OFF button on the projection display or a remote control has been activated, which results in a) continued operation of the light source and b) prevention of the light from reaching the target;
   if a predetermined period of time expires without an ON button on the projector or a remote control being activated, turning the light source off; and
   if the ON button is activated before the predetermined period of time expires, re-allowing the light to reach the target.

26. A projection display, comprising:
   a light source for converting electrical energy into light and projecting the light onto a spatial light modulator;
   the spatial light modulator for modulating the light and directing the light onto a target;
   means for turning the projection display off, which means comprises a) means for continued operation of the light source and b) means for preventing the light from reaching the target;
   means for turning the light source off after a predetermined period of time if an ON indication is not received during the predetermined period of time; and
   means for re-allowing the light to reach the target if the ON indication is received during the predetermined period of time.

* * * * *